Aug. 28, 1956　　　J. B. REICHERT　　　2,760,739
APPARATUS FOR CONTROLLING AIRCRAFT
Filed July 9, 1951　　　　　　　　　　　　　3 Sheets-Sheet 1
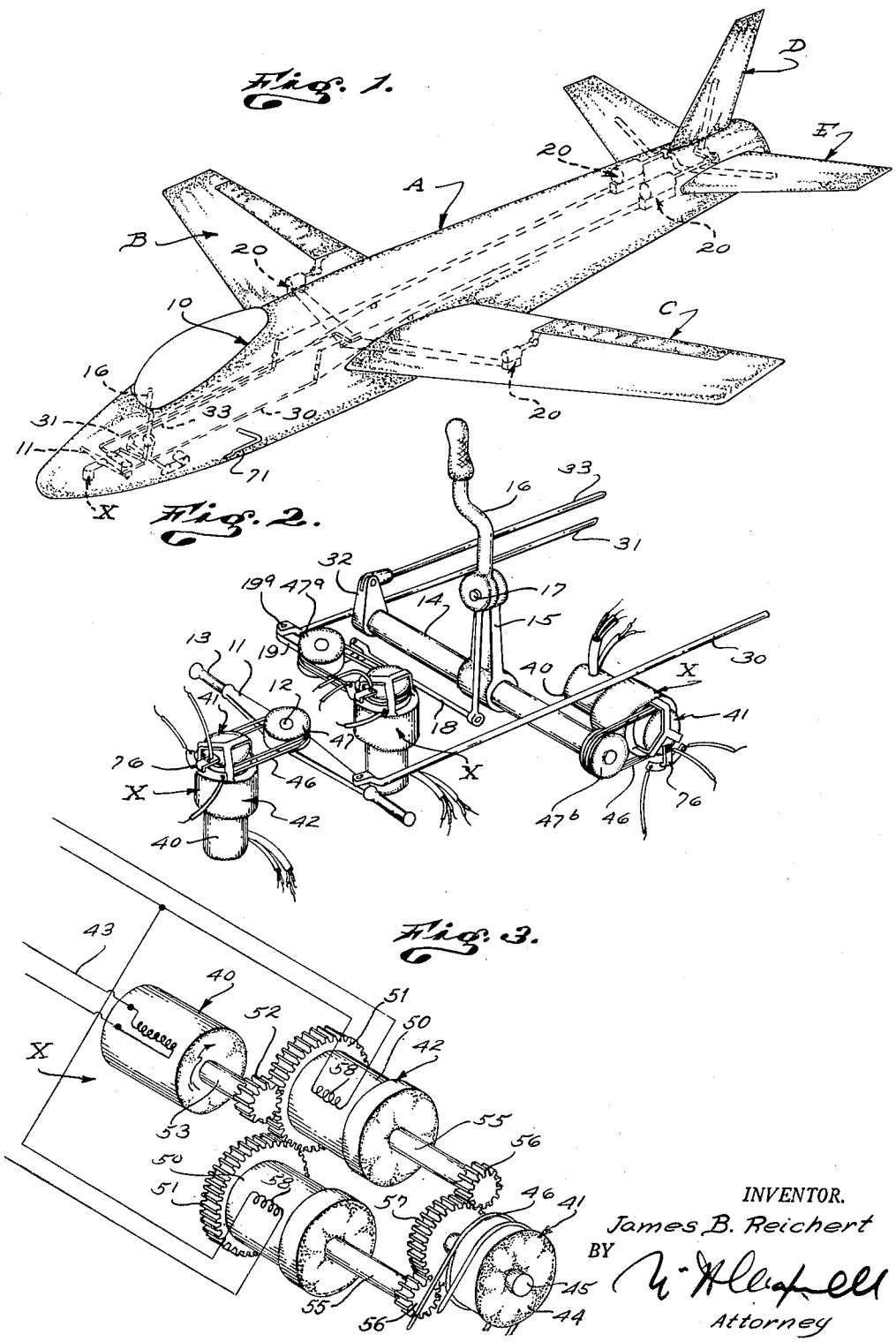
INVENTOR.
James B. Reichert

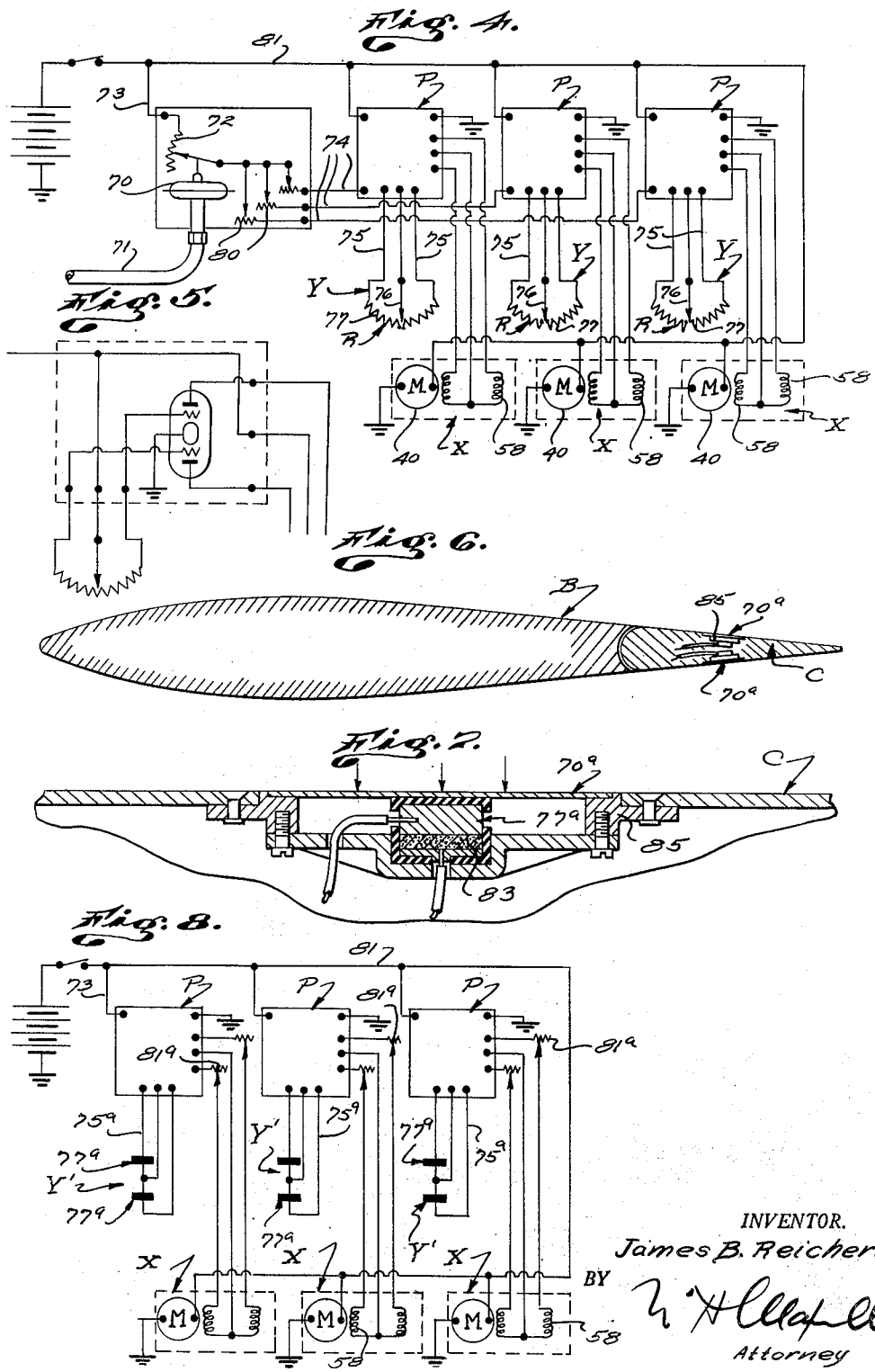

Aug. 28, 1956  J. B. REICHERT  2,760,739
APPARATUS FOR CONTROLLING AIRCRAFT
Filed July 9, 1951  3 Sheets-Sheet 3
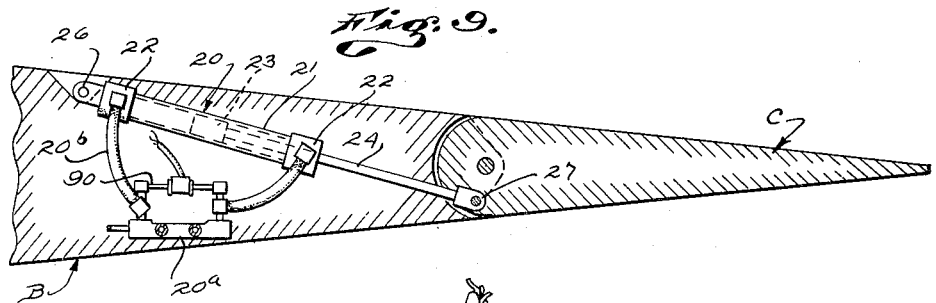
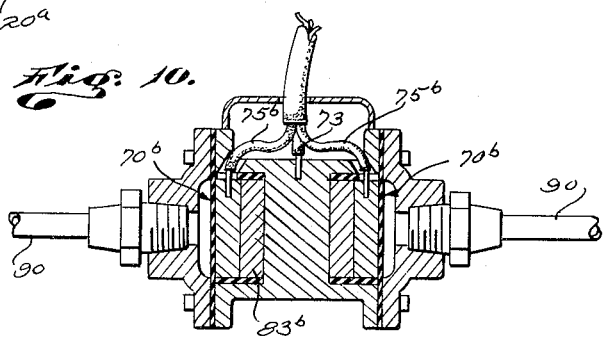
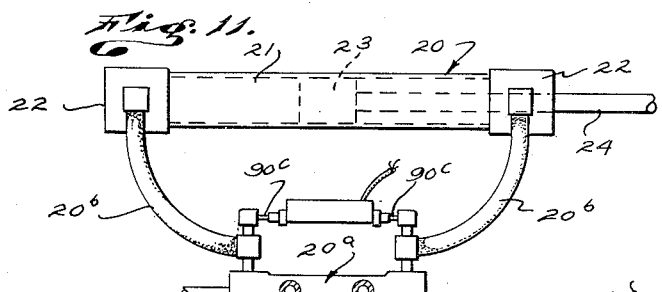
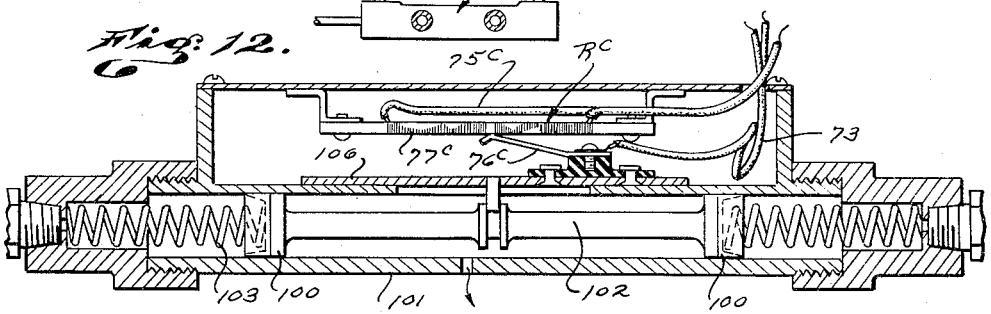
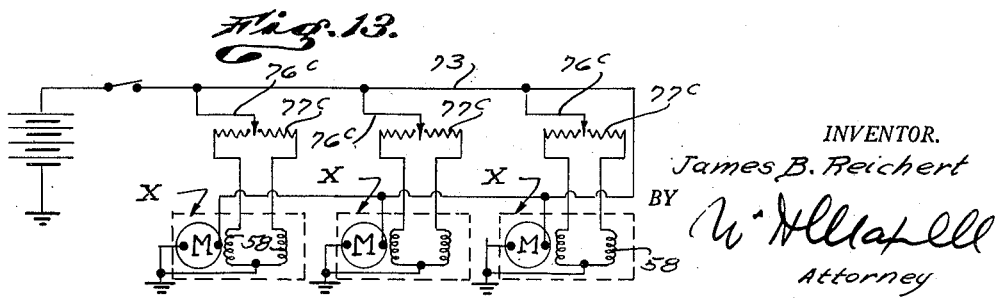
INVENTOR.
James B. Reichert
BY
Attorney 2,760,739
Patented Aug. 28, 1956

United States Patent Office 2,760,739

APPARATUS FOR CONTROLLING AIRCRAFT

James B. Reichert, Los Angeles, Calif.

Application July 9, 1951, Serial No. 235,779

8 Claims. (Cl. 244—83)

This invention has to do with aircraft control, it being a general object of the invention to provide a method and apparatus adapted for application to or incorporation in the control of aircraft in which the control elements are power operated and which serves to give the pilot the "feel" of the control elements such as occurs in the case of control elements that are manually operated. In carrying out the invention the pilot may be a person performing manual operations or it may be a so-called automatic pilot.

The ordinary or conventional heavier than air craft is, in most cases, characterized by a fuselage, wings, and flight directing elements. The flight directing elements usually involve ailerons on or in connection with the wings, and an empennage that occurs at the rear end of the fuselage which ordinarily includes a pair of elevators and a central stabilizer.

In aircraft of limited size, and in aircraft operated at low or normal speeds, the flight directing elements can be advantageously operated by the pilot through manual controls at the cockpit and suitable mechanical couplings between the controls and flight directing elements. In the normal flight of such aircraft the flight directing elements, which are flat blade-like units, remain in or close to neutral or normal positions and the air pressures thereon are such that the pilot can ordinarily hold the controls of the aircraft to maintain the flight directing elements in the desired positions or can operate them to move the flight directing elements to and from the desired positions. When I use the term "pilot" I mean to include not only a person but also mechanisms for flying aircraft which are ordinarily termed "automatic pilots." In the course of such holding or operation of the flight directing elements the pilot has what may be termed "feel" of these elements, in that the connections between the controls engaged by the pilot, or automatic pilot, as the case may be, and the flight directing elements are such as to reflect pressures exerted on the flight directing elements through the apparatus to the controls.

In most cases and under normal conditions the relationship between the pressures on the opposite sides of a flight directing element is the condition felt by the pilot. The principal factors contributing to this "feel" of the flight directing element when it is in other than the normal position are the relative movement between the aircraft and the air in which it is operating, the deflection or variation of the flight directing element from the normal or neutral position where the pressures at its sides are about equal, and the centrifugal forces acting upon the flight directing element and parts related thereto as the aircraft changes course.

Heavier than air craft have been developed to the point where some of them are of substantial size, making power operations of the flight directing elements necessary or advantageous, while in other cases aircraft have been developed to operate at such high speeds that it has been advantageous or necessary to operate the flight directing elements by or through power means. Under some circumstances a pilot can satisfactorily operate a craft in which the flight directing elements are power operated, but under other and many circumstances the power operation of the flight directing elements makes essential "feel" of the flight directing elements impossible, and operation of the craft uncertain, difficult, and in some instances, highly dangerous.

It is a general object of the present invention to provide a method and apparatus for supplying or applying force or pressure to the controls of an aircraft in which the flight directing elements are power operated, giving the pilot "feel" of the operating conditions of the elements.

It is another object of the invention to provide structure in which the pressure of air at the exterior of the craft and the position or attitude of the flight directing elements determine the force or pressure exerted on the manual controls that are engaged by the pilot.

Another object of the invention is to provide a force generator or pressure applicating device related to a manual control member, and a control means or control circuit governing the action of the force generator so the pilot has "feel" of the conditions that result from operation of the control member.

It is another object of this invention to provide air craft of the character referred to wherein the flight directing elements are power operated and wherein there are means responsive to the factors which normally subject the flight directing elements to pressure and which control the exertion of pressure on the manual controls to give the pilot "feel" of the flight directing elements.

It is a further object of this invention to provide an air craft wherein there is a flight directing element, a manual control accessible to the pilot, power means responsive to the manual control and operating the flight directing element, variable force generating means related to the manual control, and control means the action of which varies with the speed of flight of the craft and the position of the flight directing element and which controls the variable force generating means so that the "feel" experienced by the pilot corresponds to that resulting from coordination of the speed of flight, change in course and the position of the flight directing element.

Another object of the invention is to provide a structure of the general character referred to in which the control means is in the nature of a single system utilizing a single source of air pressure and coordinating the result of that pressure with the actual positions of the flight directing elements and effecting individual operation of the force generators related to the manual controls for the individual elements.

A further object of the invention is to provide a structure of the general character referred to in which there is an individual means for each force generator responsive to the air pressure at or on the flight directing element to which the force generator is related.

Another object of this invention is to provide apparatus of the general character referred to giving the pilot "feel" of the power operated flight directing elements at the controls of the aircraft, and which is of simple, light, dependable construction and such that it does not add materially to the over-all weight or complexity of the aircraft.

It is a further object of this invention to provide apparatus of the general character referred to which is so combined with or related to the essential elements of the aircraft, such as the flight directing elements, the manual controls, the power operating means and the connecting mechanisms that its failure to function or its breakdown will not, under any circumstances, impair or render inoperative any essential parts of the aircraft.

The present invention contemplates an airplane or heavier than air craft that may, for the most part, be of ordinary or conventional construction. In a typical case the aircraft may have a fuselage with a cockpit, wings, and flight directing elements with which the invention is related and including ailerons, elevators, stabilizers, etc. In such a typical craft there may be manually operated controls at the cockpit where the pilot is located, there may be power units or motors at or related to the flight directing elements, and suitable linkage or rigging between the manual controls and the governing devices of power units whereby the pilot, with a minimum of effort, can operate the manual controls and cause operation of the flight directing elements in any desired manner or to any desired extent and under practically any ordinary conditions of flight.

The present invention contemplates, generally, variable force generators connected with or to the manual controls, it being preferred, ordinarily, that there be one such generator provided for each control operation, and each of these generators preferably involves a source of power, a drive member connected with the control, and a variable drive from the source of power to the drive member. In a typical application the source of power may be an electric motor operating continuously, the drive member may be a rotatable drum connected in any suitable way with the manual control, and the variable drive may include oppositely operating variable clutch devices with their drive elements operated by the motor and their driven elements engaged with the drive member so that the direction and speed of operation of the drive member are determined by the engagement of the clutches. A control means or circuit governs the action of the pressure generator, or generators or the clutches, thereof, so that the pilot gains the desired "feel" through the manual controls.

The control means, considered broadly, may vary widely, and where the elements such as the clutches of the pressure generators are electrically operated or controlled it is generally advantageous that the control means be essentially electrical or in the nature of a control circuit connected to and governing the clutches. In one situation, assuming a craft with several flight directing elements, each power operated, the control circuit may be, in effect, a single system or circuit in which a pressure, such as air pressure at the exterior of the craft, is taken as substantially representative of a pressure that may act upon each of the flight directing elements, and this is coordinated with individual positioning of the flight directing elements so that the manual controls related thereto are subjected to varying or individual pressures to give the desired "feel" to the pilot. In another situation there may be an individual pressure means or circuit in connection with each flight directing element, and the pressure generator related thereto, so that the craft as a whole involves what may, in effect, be considered a multiplicity of independent or separated control means or circuits.

The various objects and features of my invention will be fully understood from the following detailed description of typical manners of carrying out the method of the invention and of preferred forms and applications of my invention, throughout which description reference is made to the accompanying drawings, in which:

Fig. 1 is a perspective and somewhat diagrammatic view of a typical heavier than air craft having the apparatus of the present invention applied to or incorporated therein. Fig. 2 is a fragmentary view illustrating certain portions of the air craft, and particularly the manual controls that occur at the cockpit and the parts that are directly related to such controls. Fig. 3 is a diagrammatic perspective view illustrating a portion of the structure shown in Fig. 2, and particularly the portion shown at the extreme right in Fig. 2. Fig. 4 is a general diagram of the electric circuit that may be employed in carrying out the invention with the apparatus shown in Figs. 1 to 3, inclusive. Fig. 5 is an enlarged diagrammatic view of a portion of the circuit as shown in Fig. 4. Fig. 6 is a sectional view of a wing of the air craft showing another form of structure embodying the invention. Fig. 7 is an enlarged detailed view of a portion of the structure shown in Fig. 6, being taken at a part of the aileron related to the wing. Fig. 8 is a wiring diagram of a circuit that may be employed in carrying out the invention when structure such as is shown in Figs. 6 and 7 is employed. Fig. 9 is a sectional view of a portion of a wing having an aileron combined therewith and wherein the aileron is operated by a power unit or motor and has combined therewith apparatus provided by the present invention. Fig. 10 is an enlarged detailed sectional view of a portion of the apparatus shown in Fig. 9. Fig. 11 is a view showing a power unit or motor provided for operating a flight control element such as an aileron and having combined therewith apparatus as provided by the present invention different in detail from the apparatus disclosed in the preceding figures. Fig. 12 is a detailed sectional view of a portion of the apparatus shown in Fig. 11, and Fig. 13 is a diagrammatic view illustrating an electric circuit that can be employed with apparatus such as is shown in Figs. 11 and 12.

The method of the invention is such that it will be fully understood from the following description wherein I set forth in detail various structures or devices carrying out the method aspects of the invention.

The present invention is applicable, generally, to aircraft and is particularly useful and practical as applied to heavier than air craft wherein the flight directing elements are power operated. For purpose of illustration I have, in Fig. 1, illustrated a typical craft wherein there is an elongate fuselage A, wings B projecting from the fuselage, and various flight directing elements such as ailerons C combined with or applied to the wings, and a stabilizer D and a pair of elevators E forming the empennage that occurs at the rear end of the fuselage. In accordance with typical aircraft construction the ailerons shift or work relative to the wings while the stabilizer and elevators shift or work relative to the fuselage. In accordance with conventional construction each flight directing element may be considered as pivotally supported.

In the craft illustrated in Fig. 1 the fuseladge A is provided at its forward end portion with a cockpit 10 to accommodate the pilot of the craft, and at the cockpit there are suitable or conventional manual controls. The manual controls are illustrated somewhat schematically in Fig. 2 of the drawings where one control has a simple or single action and is in the form of a foot lever 11 carried on a vertical pivot 12, the pivot being located midway between the ends of the lever. The other or second manual control has a compound action and involves a horizontally disposed rocking shaft 14 extending transversely of the craft and having an arm 15 projecting upwardly therefrom to work or operate fore and aft of the craft. A hand lever 16 is pivoted to the arm 15 by a pivot pin 17 located in a plane that extends longitudinally of the aircraft and which is normal to the axis of shaft 14 so the hand lever can operate or rock transversely of the craft. A handle is provided at the upper end of the lever 16 to be engaged by the pilot and a depending arm of the lever 16 operates a link 18 connected to a pivoted bell crank 19.

In the particular craft illustrated each of the several flight directing elements is provided with power means for its operation, for instance, each flight element is provided with a power actuated device or motor 20. In practice motors of any suitable form, type or character may be employed for the operation of the flight directing elements and for purpose of example I have illustrated fluid pressure actuated devices or motors indicated and each involves a cylinder 21 closed at its ends by heads 22, a piston 23 operating in the cylinder and a piston rod 24 projecting from the piston through one of the heads and pivoted to the flight directing element to be operated by the motor. In a typical installation such as is shown in Fig. 9, the motor is pivotally supported as by a pivotal connection 26 and the rod 24 is pivoted to the flight directing element as by means of a pivotal connection 27.

In typical installations of this character suitable element positioning mechanisms and control valves 20ª are provided at the motors and suitable mechanical connections or linkages are provided between the manual controls at the cockpit and the positioning mechanism and control valves of the motors. In the particular linkage or rigging illustrated, the foot lever 11 is operatively connected with the motor of stabilizer D through linkage including an operating rod 30. Transverse rocking of the hand lever 16 about the pivot 17 operates the bell crank 19 which is connected with the motor or motors of the ailerons through linkage including an operating rod 31. Fore and aft rocking of the hand lever 16 about the axis of shaft 14 operates a lever arm 32 on the shaft 14 which is connected to the motor or motors of elevators E through linkage including an operating rod 33.

The present invention is in no way concerned with the details, construction, or general arrangement of the various elements just referred to and it is to be understood that in practice such elements may be varied widely in form, construction and arrangement as circumstances require. Furthermore, it is to be understood that in practice the elements provided by the present invention that are combined with or which are applied to the usual or conventional parts of the aircraft may be varied in arrangement, mode of application, and in construction as aircraft construction or conditions vary.

In each form or application of the present invention a variable force generating device or pressure generator X such as is indicated in Fig. 3 of the drawings, is provided in connection with a manual control, it being preferred to provide an applicator for each action of such control. In a typical case such as is illustrated in Fig. 2 of the drawings there is but one generator X provided for or in connection with the foot lever 11 since the lever 11 has but one action, whereas there are two generators X provided in connection with the manual control that has compound action. I show a generator X provided for or in connection with the hand lever, for instance in connection with shaft 14, and a generator X is provided for or in connection with the hand lever 16, for instance connected with the bell crank which is linked to lever 16. Through the employment of the several variable pressure generators X pressures therefrom affect the rocking or pivotal movement of the foot lever 11, affect the fore and aft rocking of the hand lever 16, and also affect the side or transverse rocking of the hand lever 16.

The several variable pressure generators or applicators may be alike and each may involve, generally, a source of power or motor 40, a drive member 41, and a variable torque drive 42 between the motor and the member 41. In the embodiment shown in Fig. 3, the motor 40 is an electric motor supplied by current through a power line 43, so that it operates continuously.

The drive member is shown as a drum 44 on a shaft 45 and in the drawings it is shown as operating a flexible drive connection 46. The generator X related to the foot lever 11 has the flexible drive 46 from its drum 44 to a drum 47 fixed to the foot lever. The generator X related to the transverse movement of the hand lever 16 has its flexible drive 46 engaged around a drum 47ª fixed to the bell crank 19. The generator X related to the fore and aft rocking action of the hand lever has its flexible drive 46 engaged around a drum 47ᵇ on the shaft 14.

The variable torque drive 42 operatively connects the motor 40 and the drive member 41 and in the case illustrated it is shown as a clutch drive wherein there are two oppositely operating clutch mechanisms. The drives 50 of the clutches carry gears 51 that are meshed together and these are driven by a pinion 52 on the motor shaft 53, which pinion meshes with one of the gears 51. As a result of this arrangement which is clearly shown in Fig. 3, the drive elements of the two clutches operate oppositely. The driven sections of the clutches have shaft portions 55 that project and carry pinions 56 that mesh with a common gear 57 on the shaft 45 that carries drive member 41.

So far as the present invention is concerned the clutch mechanisms may be of any suitable form or type. In the drawings the clutch mechanisms are indicated as electric clutches or electrically controlled clutches, in which case each clutch has a control coil 58, the energization of which governs the action of the clutch.

With the construction above described and assuming, for sake of example, the pressure generator X related to shaft 14, the motor 40 operates continuously, with the result that the drivers of the clutches operate continuously and oppositely. In a typical case, if the coils 58 of the clutches are de-energized there is no torque transmitted by the clutches and consequently no movement of or pressure on the drive member 41 related to shaft 14. Assuming one of the coils 58 to be energized or partially energized, the clutch of that coil communicates torque so that the shaft of that clutch causes rotation or application of force to the member 41 in one direction. As the coil of the other clutch is energized opposite rotation or pressure is communicated to the member 41. It will be apparent that with a suitable clutch construction the degree to which a coil is energized will determine the amount of torque or pressure communicated to the member 41 and it will be immediately apparent that such torque or pressure tends either to move the manual control element to which the means X is related or it actually moves such control element, assuming that the pilot does not resist or stop such movement.

In the form of the invention illustrated in Figs. 1 to 5, inclusive, the control means is, in effect, a single system or circuit with a pressure sensitive member such as a diaphragm 70, or the like, subject to pressure of air such as occurs on the flight directing elements or at the exterior of the craft. In the particular arrangement illustrated the diaphragm 70 may be located within the fuselage or at any suitable location where it is suitably shielded or housed, and the desired air pressure can be introduced to the diaphragm as by means of a tube 71, or the like, having an open or pressure receiving end at the exterior of the craft and preferably facing forward so that air pressure that is, in effect, the head pressure or the ram air against the craft, is communicated to the diaphragm.

When the control means is electrical the control circuit or the entire control system may be subject to variation in accordance with the air pressure acting upon the diaphragm 70. In the diagram, Fig. 4, I have shown a variable resistance or rheostat 72 in the main line 73 of the control system, and the shiftable or variable element of the rheostat is linked to the diaphragm 70 so that the rheostat operates in response to the diaphragm and varies the current handled by the main line 73, which variations represent or correspond to variations in the ram air pressure exerted upon the diaphragm.

In the particular form of the invention under consideration there is a separate or individual means Y related or coupled to each pressure applicator X and each means Y involves a variable resistance R connecting a branch 74 of the power line continuing from the variable resistance 72 with coil lines 75 that continue from the resistance R to the coils of the applicator X, one to each coil, and preferably through a suitable amplifier P. The resistance R is indicated as involving a resistance element 77 for each line 75, which elements are separated or spaced apart, and a shiftable member 76, such as a contact arm, when in a neutral position, is free of both resistance elements 77 and, consequently, the circuit of the control system is open. When the contact arm 76 is moved in either direction from the neutral position one or the other of the resistance elements is engaged, and as a result current flows through the coil line 75 connected with the engaged resistance element. This results in energization of the coil of the clutch to which that line 75 connects. In practice the electrical system may be such as to make it advantageous to vary or modify the current between the resistance R and the coils of the clutches, as by means of a suitable amplifier, which element is indicated generally in Fig. 5 of the drawings.

The shiftable member of resistance R is so related or coupled to the flight control element to which the force generator X is applied or to the apparatus coupled to that element so that its position is a reflection of or is governed by the position of that element. In a typical arrangement when the flight control element is in a neutral position the movable contact arm 76 is in the neutral position and when the flight control element is moved in one direction one resistance element 77 is engaged, whereas when it is moved in the other direction the other resistance element is engaged. In the particular arrangement illustrated in the drawings and best shown in Fig. 2 the movable contact arm 76 is on the drive member 41 of the means X, which part necessarily moves with or in a manner corresponding to the flight directing element to which that force generator is related.

From the drawings and particularly from Fig. 4 it will be observed that where there are several force generators X there are as many units of means Y, and each of these is connected into the main circuit by a branch line 74. In practice various balancing or adjusting means may be incorporated in the circuit so that the desired pressures or "feel" effects are communicated to the manual controls and as an example of such adjusting means I have shown a variable resistance 80 in each branch line 74, with the result that the circuit can be set so that corresponding movements of the shiftable contacts of the several resistance elements R may result in somewhat different regulation or flow of current to the clutches of the means X. In the particular system illustrated in Fig. 4 a branch 81 of the power line 73 supplies power to the amplifiers P and to the motors 40 of the means X.

With the form of control just described, as the craft is in flight and so long as the flight directing elements are in neutral positions the motors 40 of the means X operate, but the shiftable contacts 76 of the resistance elements R remain in the neutral positions so that there is no current passed to the coils of the clutches of the means X. When any one of the resistance elements is moved from its neutral position the contact 76 related to that flight directing element engages one or the other of the resistance elements 77, depending upon the direction the flight directing element has been operated and the degree of operation of the flight directing element is represented by the position of the movable contact relative to the engaged resistance element. Under this condition current from the main line 73 flows to one of the coils of the force generator related to that flight directing element and this particular current flow is influenced by the setting of rheostat or resistance 72 which is determined by the air pressure derived through tube 71. This particular flow is under general adjustment of a resistance 80, or the like, and the current actually supplied to the coil may be that supplied from the amplifier P where such an element is employed. The amplifier for the means X operates one clutch of the means X with consequent exertion of pressure upon the drive member of that means X in a direction determined by which of the clutches is engaged or energized, and the extent of that pressure is determined by the current supplied to the coil. The pressure thus exerted is communicated to the manual control related to the flight directing element so that the pilot feels the pressure. The pilot may allow the pressure thus exerted to actually move the manual control or he may simply resist movement by holding the control in the desired manner.

It will be apparent that through the control means that I have just described the pilot is given effective and practical "feel" of the flight directing elements and that the control means coordinates the principal factors involved in the desired "feel," namely, the air pressure at the exterior of the craft and the position of the flight directing elements, as from normal or neutral positions.

In the form of the invention illustrated in Figs. 6, 7 and 8 the control means Y' in effect represents an independent control circuit for each means X, since there need be nothing in common except a power line 73. In the diagram, Fig. 8, variable resistance elements 77$^a$ are shown related to coil lines 75$^a$, the lines 75$^a$ being run from the resistance elements 77$^a$ to the coils of the pressure generator X involved. The main power line 73 maintains power or potential at the resistance elements 77$^a$ and as one or the other of the resistance elements 77$^a$ is operated current flows therethrough and to one or the other of the coil lines 75$^a$ with consequent energization of a clutch of the generator X. Individual adjusting means or variable resistance units 81$^a$ are shown in the coil lines 75$^a$.

In accordance with this form of the invention the resistance elements 77$^a$ are related to the structure of the flight directing element so as to control and vary the current in the circuit responsive to pressure differential at the two sides of the flight directing element. In the particular construction illustrated each resistance element 77$^a$ is adapted to be operated by a pressure responsive device or diaphragm 70$^a$ and is shown as involving a carbon pile 83 or the like through which the circuit is passed. The relationship of parts as illustrated in Fig. 7 may be such that when the diaphragm 70$^a$ is subjected to pressure, as indicated by the arrows, the carbon pile is subjected to pressure and current flowing therethrough is affected or varied. In such a case the current varies with the pressure exerted on the pile through or from the diaphragm 70$^a$.

The desired operation of the pressure responsive elements or diaphragms 70$^a$ may be gained in any suitable manner. In the relationship illustrated in Fig. 6 the diaphragms 70$^a$ are directly related to or carried by the flight directing element, shown in Fig. 6 as an aileron C, one diaphragm being at one side of the aileron and the other at the opposite side thereof. The diaphragms may be carried in suitable mountings 85 set in the structure or skin of the flight directing elements so that the diaphragms are, in effect, flush with and form continuations of the surface of the element and consequently do not in any way interfere with or impair the action or actions of the element.

With the form of control illustrated in Figs. 6 to 8, inclusive, when the craft is in normal or straight flight and the flight directing elements are in the normal position, the air pressures against the two diaphragms 70$^a$ of each control circuit will be substantially equal and consequently even though there may be some flow through the carbon piles 83 related to the diaphragms, by reason of the pressure of the air, such currents will operate the coils of the pressure generator X related to that circuit equally and, consequently, tend to drive the driver of that generator X in opposite directions, to the end that no force or pressure is felt in the manual control related to that flight directing element. When the fligst directing element is operated in each direction from the normal a differential in air pressure occurs at the two sides thereof and as a consequence one of the carbon piles is subject to greater pressure than the other. This results in a greater flow of current to one of the coils of the generator X with consequent application of pressure in one direction to the manual control related to that generator.

In the form of the invention illustrated in Figs. 9 and 10 the general nature of the individual control circuits is substantially like that described. However, in this case there is a different means of gaining the desired pressures upon the controlling diaphragms 70$^b$. In this form of the invention the resistance elements are related to the structure of the flight directing elements so as to be responsive to stress or pressures exerted on the structure. The resistance elements may be mounted on structural parts which are subject to deflection or bending under conditions that occur during flight, or as I prefer, they may be subjected to fluid pressures obtained as a result of pressure on the flight directing structure. In each of the control circuits in this form of the invention current from the power line 73 passing to the coil lines 75$^b$ is through carbon piles 83$^b$, or the like. The pressure responsive diaphragms 70$^b$ are related to the piles 83$^b$ so that variations in pressure on the diaphragms result in variations in current to the coils of the pressure generator subject to the control circuit.

In this form of the invention the diaphragms 70$^b$ instead of being subjected directly to air pressure, that is, instead of being at the exterior of the craft, as shown in Fig. 6, are located within the structure of the craft and the pressures communicated thereto are derived from the motor 20 connected with or operating the control element. In this particular case pressure lines 90 communicate pressure occurring at the ends of cylinder 21 of the motor 20, one supplying pressure to one diaphragm 70$^b$ and the other supplying pressure to the other diaphragm 70$^b$. In the particular hook-up illustrated in Fig. 9 the control valve 20$^a$ of the motor has flexible lines 20$^b$ extending therefrom to the ends of cylinder 21 and the lines 90 to the diaphragms 70$^b$ are in communication with the lines 20$^b$.

In operation of the control means as shown in Figs. 9 and 10 the air pressure differential occurring on the flight directing element and the centrifugal forces acting on the element, in the case illustrated on the aileron C, causes the desired operation of the control circuit. When there is any differentiation in pressure at the two sides of the element C there is a tendency for the element to move in one direction and there is a consequent differential in pressure at the ends of cylinder 21. This condition is communicated to the diaphragms 70$^b$ through the lines 90 with consequent differentiation in operation of the carbon piles 83$^b$ so that there is a different energization of the coils of the clutches of the generator X. As has been described above, when there is a differentiation in energization of the coils of the generator X there is a corresponding and proportional pressure applied by the generator to the manual control related thereto.

In the form of the invention illustrated in Figs. 11, 12 and 13 the pressure responsive elements instead of being diaphragms are pistons 100 in a cylinder 101 and the pistons are connected by a rod 102. Suitable means such as springs 103 operate oppositely on the assembly of pistons and rod and normally yieldingly hold this assembly in a central or neutral position. In the particular case illustrated the desired operating pressures are applied to the pistons 100 through lines 90$^c$ related to the motor 20 as are the lines 90, illustrated in Fig. 9 of the drawings.

In this form of the invention the current from or handled by the main power line 73 is varied, not through carbon piles but through a variable resistance device R$^c$. The arrangement of parts is such that the shiftable contact 76$^c$ of the resistance device is coupled to the assembly of pistons 100 and rod 102, as through a slide 106, so that as the contact 76$^c$ moves with the assembly of pistons resistance elements 77$^c$ are contacted in either direction from the neutral position of the contact 76$^c$. A coil line 75$^c$ extends from each resistance element to a coil of the generator X. In operation of the control as shown in Figs. 11 to 13, inclusive, when there is equal pressure at the two sides of the flight directing element there will be equal pressure, or substantially equal pressure, on the two pistons 100 so that the springs 103 maintain the piston unit or assembly in the neutral position where the contact 76$^c$ is out of contact with the resistance elements 77$^c$. When an appreciable difference in pressure occurs at the two sides of the flight directing element, or as the operator actuates the structure to move the flight directing element, the pressure on the pistons 100 will vary and there will be corresponding or consequent moving of the piston assembly in one direction or the other, with consequent engagement of the contact 76$^c$ with a resistance element 77$^c$ and a corresponding energization of a coil of the related generator X resulting in "feel" pressure being exerted on the manual control engaged by the pilot.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. In combination, an aircraft having a flight directing element, a manual control member, a power means adapted to operate said element, means connecting said control member and said power means whereby the power means is controlled by said member, a force generator coupled to the control member to apply force thereto, and a control governing the action of the force generator and responsive to conditions determining pressures on said element and including two coordinated parts, one of which is responsive to the ram air pressure and the other to the operative position of the said element.

2. In combination, an aircraft having a flight directing element, a manual control member, a power means adapted to operate said element, means connecting said control member and said power means whereby the power means is controlled by said member, a force generator coupled to the control member to apply force thereto, and a control governing the action of the force generator and responsive to conditions determining pressures on said element and including an electric circuit and two separate means governing the circuit, one responsive to the ram air pressure and the other to the operative position of the said element.

3. In combination, an aircraft having a plurality of flight directing elements, a manual control member for each of said elements, a power operating means for each of said elements, means connecting said control members and the power operating means of the elements related thereto whereby each power operating means is controlled from a control member, a force generator coupled to each manual control member to apply mechanical pressure thereto, and control means including a control circuit with current supply connections to the force generators, a pressure sensitive element responsive to ram air pressure and operating a regulator varying the current in the circuit, and current regulating means in the supply connections to each force generator responsive to the operative position of the element to which the force generator is related.

4. In combination, an aircraft having a plurality of flight directing elements, a manual control member for each of said elements, a power operating means for each of said elements, means connecting said control members and the power operating means of the elements related thereto whereby each power operating means is controlled from a control member, a force generator coupled to each manual control member to apply mechanical pressure thereto, and control means including a control circuit with current supply connections to the force generators, a ram air pressure actuated regulator varying the current in the circuit, a duct open at the exterior of the craft and communicating ram air pressure to said regulator, and current regulating means in the supply connections to each force generator responsive to the operative position of the element to which the force generator is related.

5. Apparatus for applying pressure to a manual control member of an aircraft which control member governs a power means operating a flight directing element including, a force generator adapted to exert pressure upon the manual control member, and a control governing the action of the force generator and responsive to conditions determining air load pressures on said flight directing element and including two coordinated parts, of which one is responsive to the ram air pressure of the aircraft and the other to the operative position of the said element.

6. Apparatus for applying pressure to a manual control member of an aircraft which control member governs a power means operating a flight directing element including, a force generator adapted to exert mechanical pressure upon the manual control member, and a control governing the action of the force generator and responsive to conditions determining air load pressures on said flight directing element and including an electric circuit and two separate means governing the circuit, one responsive to ram air pressure of the aircraft and the other to the operative position of the said element.

7. Apparatus for applying pressure to manual control members of an aircraft which control members govern separate power means each operating a flight directing element including, a force generator adapted to be coupled to each manual control member to apply mechanical pressure thereto, a control circuit with electrical current supply connections to the force generators, a ram air pressure actuated regulator varying the current in the circuit, and current regulating means in the electrical supply connections to each force generator cooperatively related to the operative position of the element to which the force generator is related.

8. Apparatus for applying pressure to manual control members of an aircraft which control members govern separate power means each operating a flight directing element including, a force generator adapted to be coupled to each manual control member to apply mechanical pressure thereto, a control circuit with electrical current supply connections to the force generators, an air pressure actuated regulator varying the current in the circuit, a duct open at the exterior of the craft and communicating ram air pressure to said regulator, and current regulating means in the electrical supply connections to each force generator responsive to the operative position of the element to which the force generator is related.

References Cited in the file of this patent

UNITED STATES PATENTS

| 2,445,343 | Tyra | July 20, 1948 |
| 2,475,484 | De Nise | July 5, 1949 |
| 2,485,292 | Kail | Oct. 18, 1949 |
| 2,508,883 | Knowler et al. | May 23, 1950 |
| 2,511,846 | Halpert | June 20, 1950 |
| 2,519,233 | Davis et al. | Aug. 15, 1950 |
| 2,522,434 | Dehmel | Sept. 12, 1950 |
| 2,695,145 | Lear et al. | Nov. 23, 1954 |

OTHER REFERENCES

Product Engineering, vol. 21, Iss. 7, pp. 131–133, inclusive. Published July 1950.

Parziale et al.: AIEE Transactions, vol. 69, pages 150 to 157, inclusive, December 1949.